(12) United States Patent  
Vantrease

(10) Patent No.: US 9,481,493 B2
(45) Date of Patent: Nov. 1, 2016

(54) INTERLOCK-ABLE FINGERED CLOSURE CLIPS

(71) Applicant: Joshua D. Vantrease, Selah, WA (US)

(72) Inventor: Joshua D. Vantrease, Selah, WA (US)

(*) Notice: Subject to any disclaimer, the term of this patent is extended or adjusted under 35 U.S.C. 154(b) by 0 days.

(21) Appl. No.: 13/844,042

(22) Filed: Mar. 15, 2013

(65) Prior Publication Data
US 2014/0250636 A1 Sep. 11, 2014

Related U.S. Application Data

(63) Continuation-in-part of application No. 29/447,985, filed on Mar. 8, 2013, now Pat. No. Des. 707,553.

(51) Int. Cl.
 *B65D 33/16* (2006.01)
(52) U.S. Cl.
 CPC ........... *B65D 33/1625* (2013.01); *Y02W 90/13* (2015.05); *Y10T 24/155* (2015.01); *Y10T 24/44923* (2015.01)
(58) Field of Classification Search
 CPC ............ B65D 33/1625; Y10S 206/82; E04F 2201/096; E04F 2201/098; E04F 2201/091; E04F 2201/09
 USPC ........... 24/30.5 S, 30.5 R, 563; 206/820, 343
 See application file for complete search history.

(56) References Cited

U.S. PATENT DOCUMENTS

| | | | |
|---|---|---|---|
| 3,164,249 A | 1/1965 | Paxton | |
| 3,164,250 A | 1/1965 | Paxton | |
| 3,270,874 A | 9/1966 | Hilton | |
| 3,767,039 A * | 10/1973 | Schroter | ......... 206/390 |
| 4,026,413 A | 5/1977 | Britt et al. | |
| 4,333,566 A | 6/1982 | Holmes | |
| 4,341,303 A | 7/1982 | Britt | |
| 4,361,935 A | 12/1982 | Paxton | |
| D299,434 S | 1/1989 | Burford | |
| 4,911,293 A | 3/1990 | Holmes | |
| 5,202,166 A * | 4/1993 | Crompton | ......... A63F 9/001 273/153 R |
| D539,140 S | 3/2007 | Irwin | |
| 7,797,890 B2 * | 9/2010 | Thrush | ......... E04F 15/10 446/116 |
| 8,163,118 B2 | 4/2012 | Irwin et al. | |
| 2007/0059481 A1 * | 3/2007 | Lin | ......... E04F 15/02 428/80 |
| 2012/0011791 A1 * | 1/2012 | Lach | ......... A47G 27/0293 52/309.3 |

* cited by examiner

*Primary Examiner* — Robert J Sandy
*Assistant Examiner* — Michael Lee
(74) *Attorney, Agent, or Firm* — Svendsen Legal, LLC.

(57) ABSTRACT

A multi-closure strip of clips with one or more openings to hold the neck of a bag, which include a male and a female interlocking portion to hold the clips together in a series. Each clip includes a set of male and female slots at a first edge, and a set of male and female slots at a second edge. Neighboring clips can interlock or mate-ably attach to the respective sets of slots and fingers without the need for adhesive, and without fracture of the clip material. The clips can be made of a resilient plastic or biodegradable material, or any recyclable products.

15 Claims, 8 Drawing Sheets

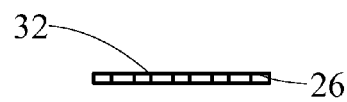
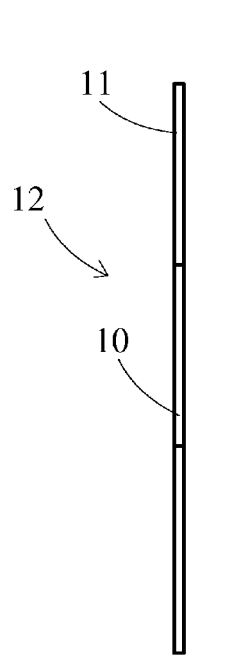
FIG. 10
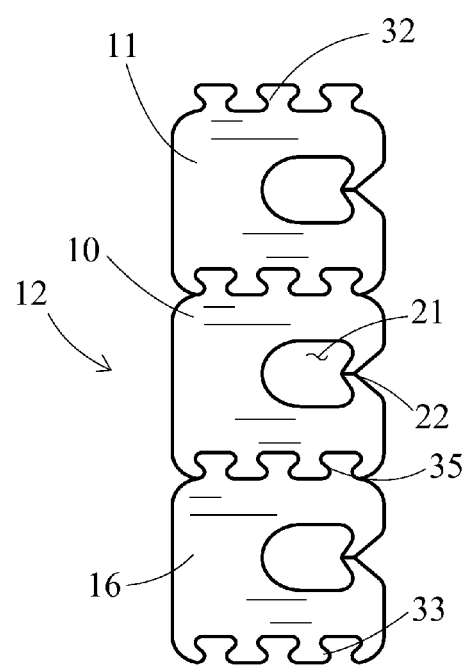
FIG. 11  FIG. 12  FIG. 13
FIG. 14

INTERLOCK-ABLE FINGERED CLOSURE CLIPS

This application is a Non-Provisional Utility application claiming priority to U.S. Design patent application Ser. No. 29/447,985, filed Mar. 8, 2013.

TECHNICAL FIELD

This invention pertains to closures or clips formed of flat plastic material, the closures for receiving portions of flexible bags and more particularly to strips of such clips, which can be separated by disconnecting adjacent clips along the strip. More specifically, the invention relates to an improved interlock-able clip for bags, where strips of the clips are held together by fingered, interlocking portions on the clips.

BACKGROUND OF THE INVENTION

'Bag-clip' types of closures are commonly used for holding closed the necks of flexible bags. Generally, these closure clips, also referred to as simply as 'closures,' 'clips,' or 'bag-clips,' are formed of semirigid flat, plastic material, and can be manufactured and handled in bulk as multi-closure strips of such clips, which can be separated by the automated breaking the connections between the adjacent clips of the strip, as each individual clip applied to a bag in succession. Conventionally, the individual clips in these strips are 'frangible' from adjoining, neighboring clips, in that they break apart easily to separate from the remaining strip of clips. These conventional clips have one or more 'tabs' or 'webs' that physically adjoin and interconnect each clip to the neighboring clip in the strip. U.S. Pat. Nos. 3,164,249; 3,164,250; 4,333,566; and 4,911,293, all show examples of these interconnected clip strips employing this conventional tabbed material interconnection between clips.

Several difficulties are exemplified in these prior configurations and designs of clip strips, which are separated from the strip, either manually or with a machine, by physically breaking webs or tabs of material that interconnect adjacent clips in the strip. Occasionally, and especially if the machines are in poor operating condition, the webs or tabs that interconnect adjacent clips will not shear off as desired, leaving the separated clip with jagged protrusions or ejecting a residual tab piece. This residual piece may be very small, but can hamper or foul the clip handling and bagging machinery, or end up as a contaminant into the clipped item. In addition to obtaining a clean break in the material along the separating edge of each clip, it is also necessary that the webs, tabs, or other material that interconnects adjacent clips has sufficient strength while connected in the form of the strip, so that clips do not break and detach prematurely during machine or manual handling of the strip, or in an automated process for applying the clip to an article.

The following is a disclosure of the present invention that will be understood by reference to the following detailed description taken in conjunction with the accompanying drawings.

BRIEF DESCRIPTION OF DRAWINGS

FIG. 10 is a first end view of a strip of interlocking fingered clips, according to an embodiment of the invention;

FIG. 11 is a first side view of a strip of interlocking fingered clips, according to an embodiment of the invention;

FIG. 12 is a front plan view of a strip of interlocking fingered clips, according to an embodiment of the invention, the back plan view being a mirror image thereof;

FIG. 13 is a second side view of a strip of interlocking fingered clips, opposite to the first side view of FIG. 11;

FIG. 14 is a second end view of a strip of interlocking fingered clips opposite to the first end view of FIG. 10, according to an embodiment of the invention;

Figure 1:
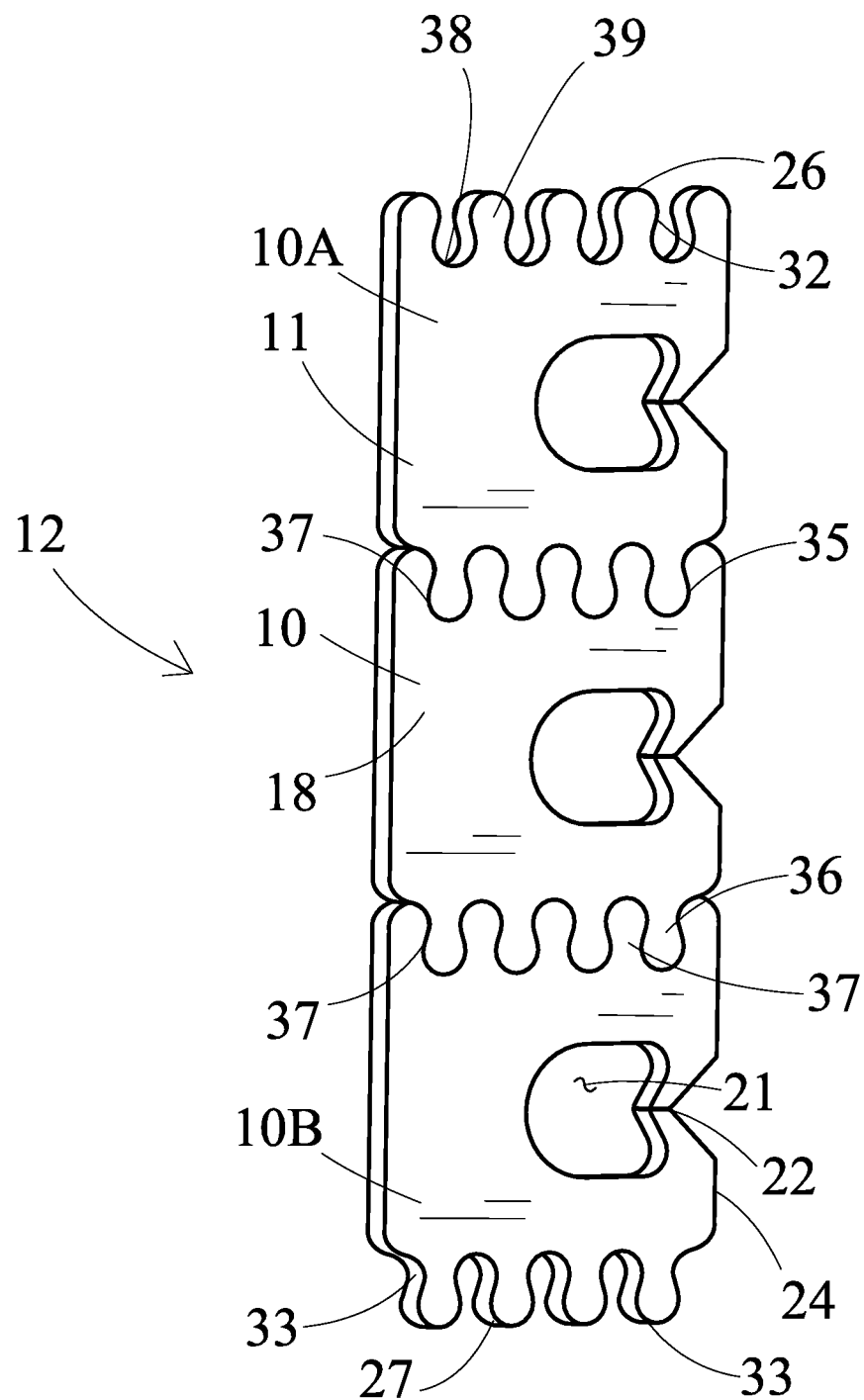
FIG. 1 is a perspective view of a strip of a multiple of interlocking fingered clips, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

Figure 2:
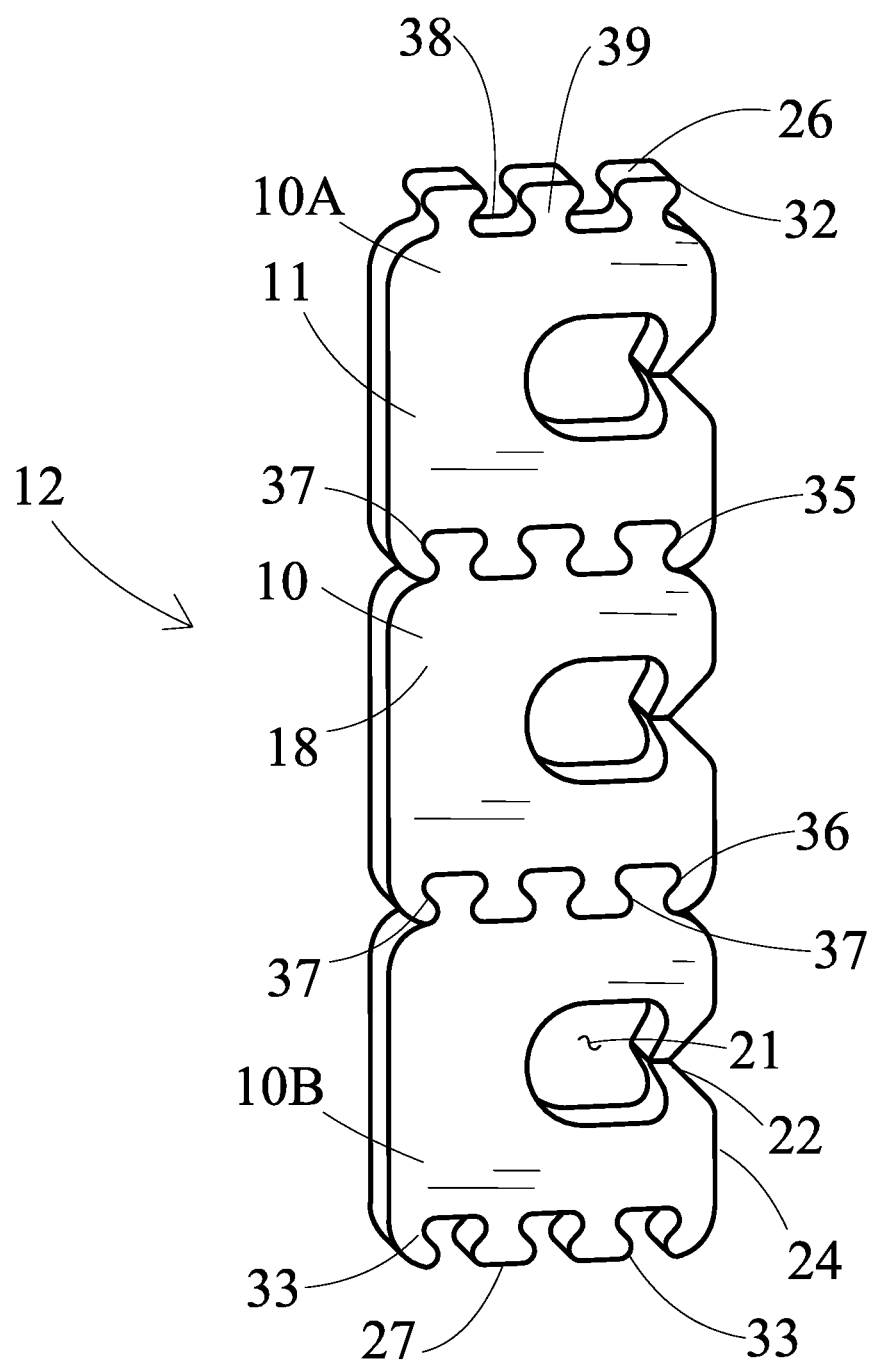
FIG. 2 is a perspective view of a strip of a multiple of interlocking fingered clips, according to an embodiment of the invention.
Figure 3:
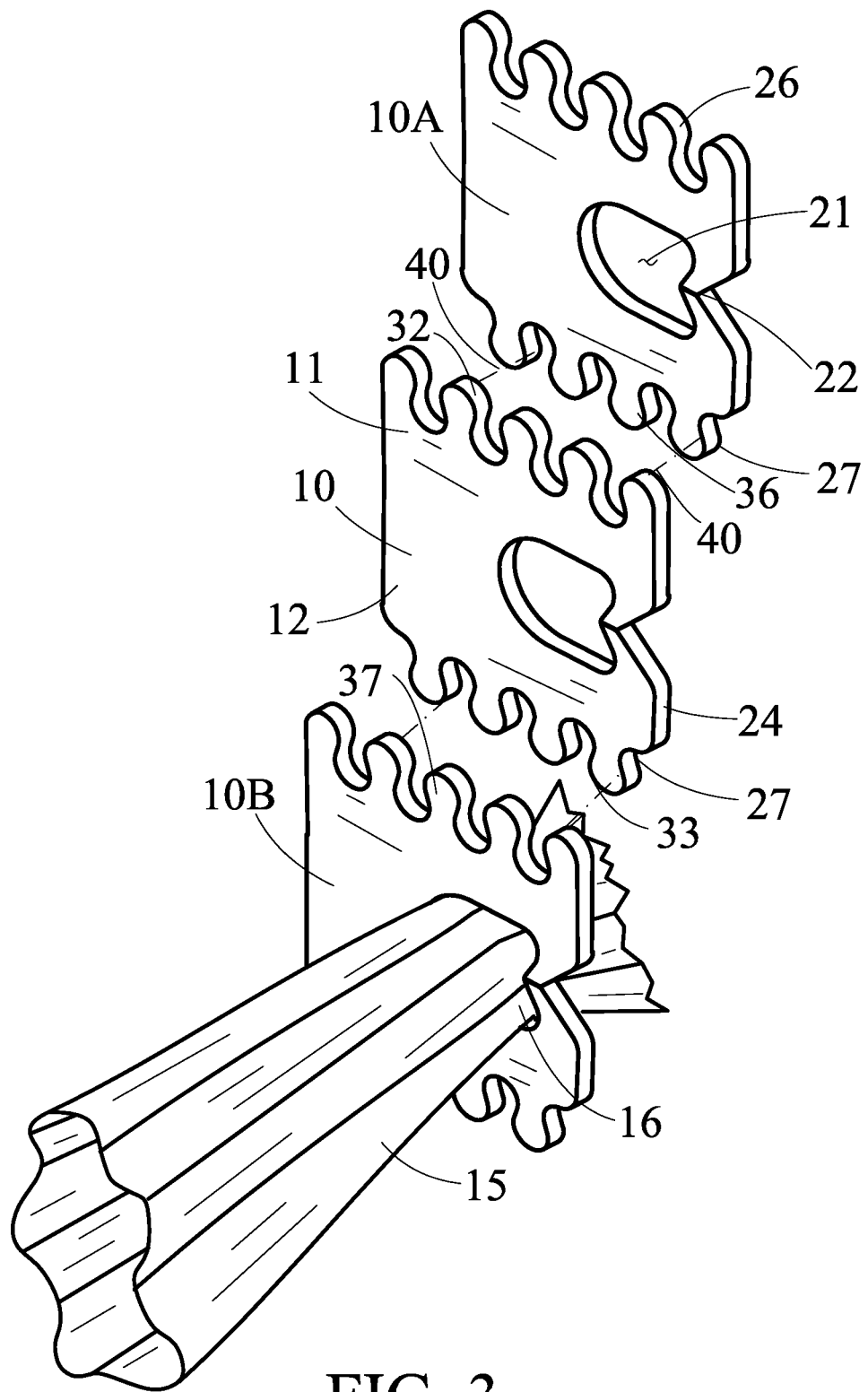
FIG. 3 is a perspective view of the interlock-able fingered clips, according to an embodiment of the invention.
Figure 4:
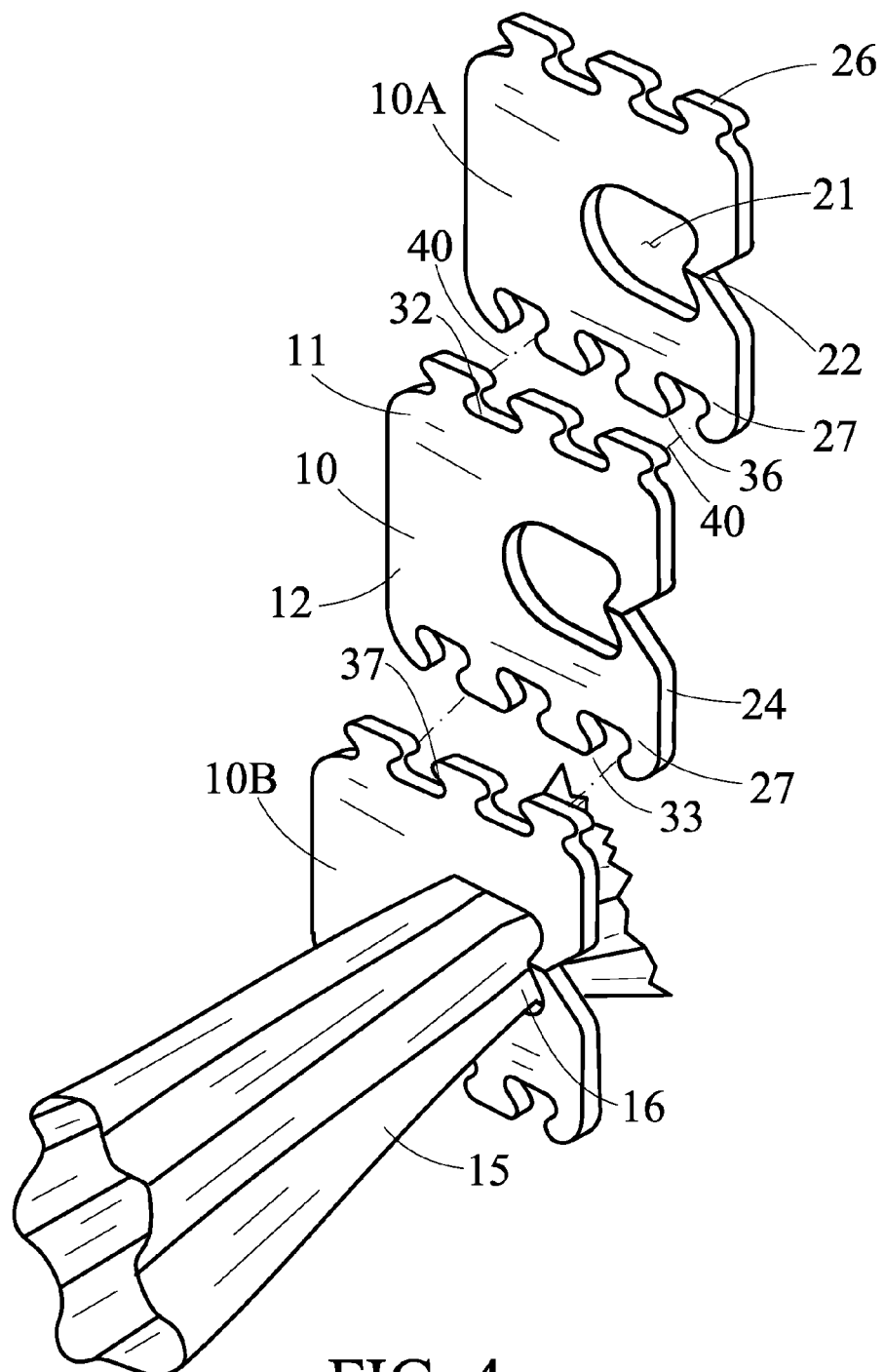
FIG. 4 is a perspective view of interlock-able fingered clips, according to an embodiment of the invention.

The present invention provides an improved interlocking and interlock-able fingered clips, with FIGS. 1 through 16 showing preferred embodiments of a clip 10 for closing a bag 15, having features according the present invention, with FIGS. 1 and 2 illustrating a strip of clips 12, each clip with a first set of slots and fingers 32 at a first end edge 26 of the clip, opposite a second set of slots and fingers 33 at a second end edge 27 of the clip. Each clip is formed of a flat material 11, such as a thin plastic sheet or strip, and is usable to attach to a bag 15, and more specifically to close a neck 16 of a bag, as shown in FIGS. 3 and 4.

Figure 15:
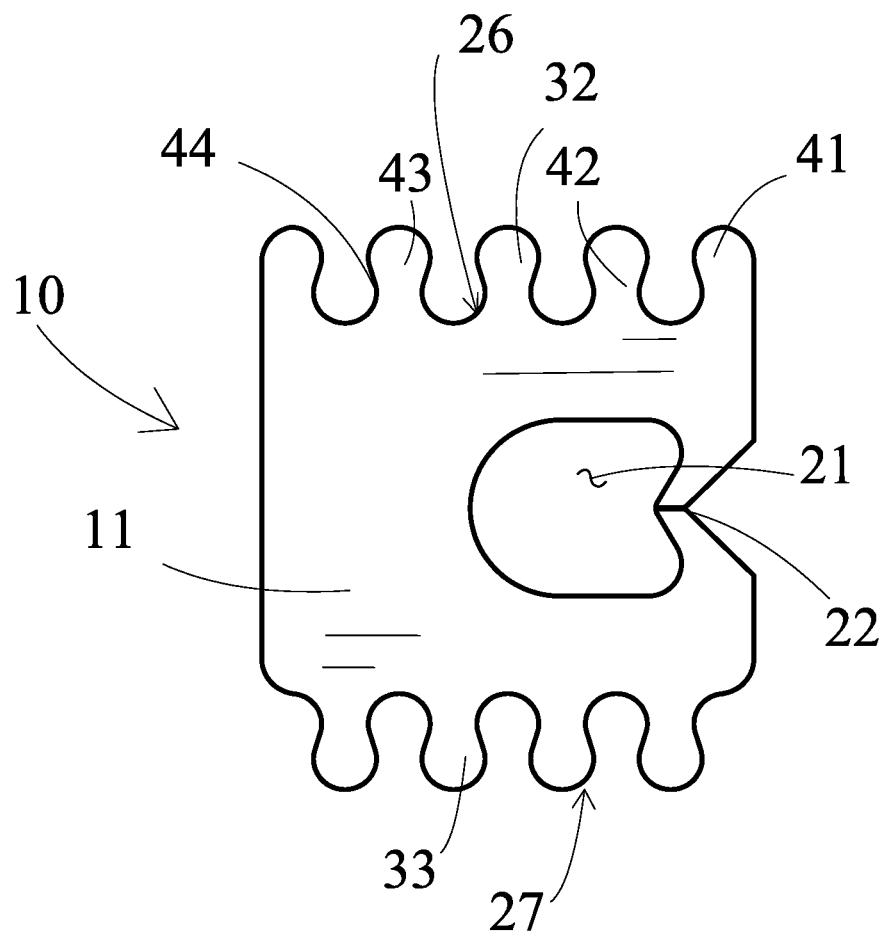
FIG. 15 is a perspective view of interlocking fingered clip, according to an embodiment of the invention.
Figure 16:
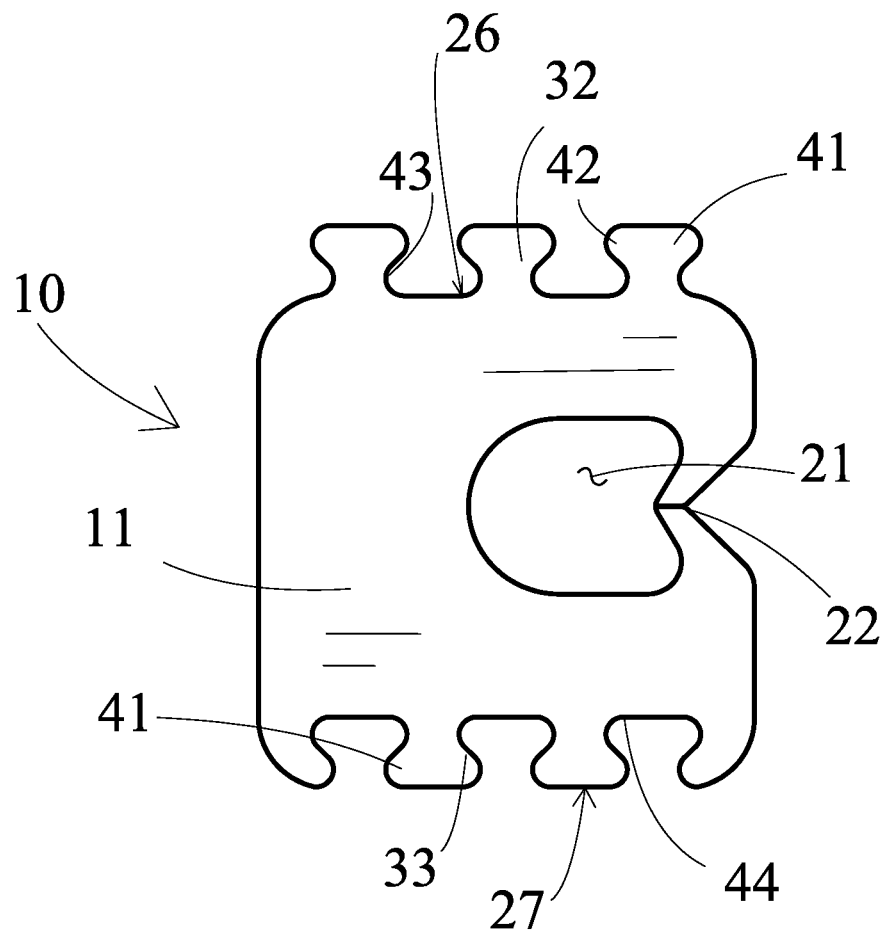
FIG. 16 is a perspective view of interlocking fingered clip, according to an embodiment of the invention.

The clip 10, whether as a singular clip or in a strip 12 that can be coiled into a roll, includes a planar clip surface 18 surrounding an aperture 21 having a mouth 22, the mouth located on a side edge 24 of the clip. Specifically, in the form of the strip or an interlocked series of clips as shown in FIGS. 15 and 16, the strip of clips is made up of individual clips that are interlock-ably fitted together with a multiple of rounded slots 44 with each slot acting as a female element, which are received into a multiple of rounded fingers 41 with each finger acting as a male element. Together, the multiple of fingers are received within and mate to the multiple of slots, to form an interlock-able connection 35 between each of the clips in the series or strip. Each clip can be pushed out of the interlock-able connection in turn, typically after the clip receives a neck 16 of the bag 15 or other such similar item. Additionally, as shown in FIGS. 2 and 3, the neck of the bag can enter the mouth of the clip and is held within the aperture, closing the bag.

Figure 5:
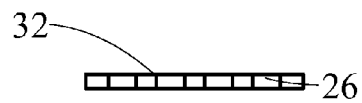
FIG. 5 is a first end view of a strip of interlocking fingered clips, according to an embodiment of the invention.
Figure 6:
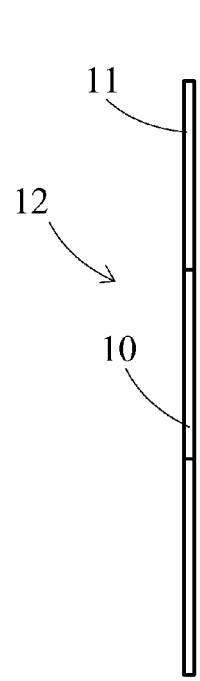
FIG. 6 is a first side view of a strip of interlocking fingered clips, according to an embodiment of the invention.
Figure 7:
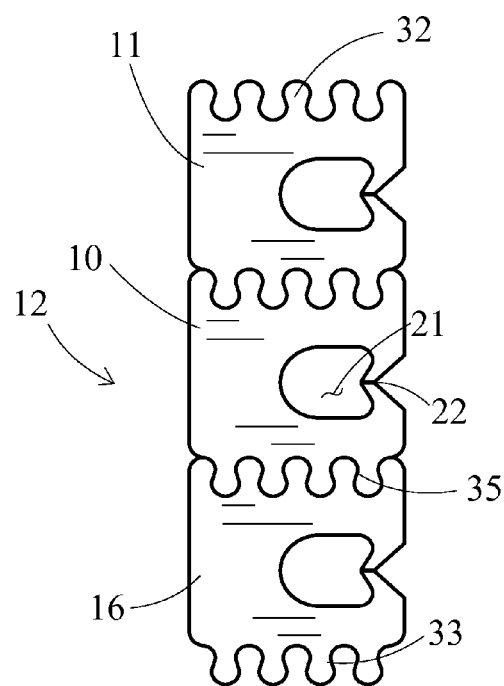
FIG. 7 is a front plan view of a strip of interlocking fingered clips, according to an embodiment of the invention, the back plan view being a mirror image thereof.
Figure 8:
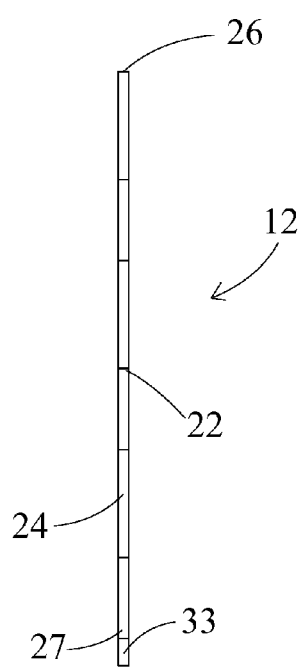
FIG. 8 is a second side view of a strip of interlocking fingered clips, opposite to the first side view of FIG. 6.
Figure 9:
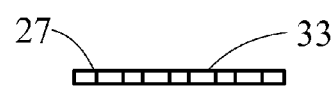
FIG. 9 is a second end view of a strip of interlocking fingered clips opposite to the first end view of FIG. 5, according to an embodiment of the invention.

As shown in FIGS. 5 through 14, each clip 10 includes the first end edge 26, opposite on the clip from the second end edge 27. The side edge 24 of the clip is located between the first end edge and the second end edge, as shown in FIGS. 8 and 13. As shown in FIGS. 5 and 10, the first edge end of the clip includes the first set of slots and fingers 32, and as shown in FIGS. 9 and 14, the second end edge of the clip includes the second set of slots and fingers 33.

As shown in FIGS. 1 and 2, a first neighboring multiple of slots and fingers 36 of an adjacent or first neighboring clip 10A in series, or as part of the strip 12 of clips, is interlock-ably receivable into the first set of slots and fingers 32 of the clip 10. The first set of neighboring slots and fingers is separable from the first set of slots and fingers, without fracture of the flat material 11 that forms the clips. At the opposite end of the clip from the first set of slots and fingers, the second set of slot and fingers 33 of the clip is interlock-ably receivable into a second set of neighboring slots and fingers 37 of a second adjacent or second neighboring clip 10B in series, or also as part of the strip of clips. The second set of slots and fingers is separable from the second set of neighboring slots and fingers, also without fracture of the flat material 11 that forms the clips. With the present invention, the elimination of 'webs' or 'welds' conventionally employed to interconnect adjacent clips, prevents any jagged protrusions from the clips, or the generation of small residual fingers pieces. Jagged protrusions and residual interconnection pieces can occur upon any fracturing of the flat material in a disconnection of individual clips from the strip in succession.

The clip 10 of the present invention can also conserve on space, as it is more compact along the length of the strip 12 of clips, as compared to prior multi-closure clips. These prior clips often leave an approximate 0.05 inch gap between each clip, creating a small wasted portion of material, which can add up to approximately 200 more clips for the a conventional 4,000 clip roll.

The terms "approximately" or "approximate" are employed herein throughout, including this detailed description and the attached claims, with the understanding that is denotes a level of exactitude commensurate with the skill and precision typical for the particular field of endeavor, as applicable.

The interlock-able connection 35 of the clip 10 of the present invention embodies a much improved multi-closure type of strip 12 in which the closures are unlocked from rather than fractured from or broken-off the remaining strip. This smoothly contoured interlock-able connection is shown in FIGS. 3 and 4. Intrinsically, the edges of the clip are smoothly edged, without protruding jagged tabs or residual shards. These residual shards can either damage the bag 15, a product within the bag, or injure a person that is trying to work with or handle the clip. As shown in FIGS. 1, 2, 7 and 12, the first set of neighboring slots and fingers 36 matches to and mates precisely within the first set of slots and fingers 32 of each clip of the strip, and the second set of slots and fingers 33 matches to and mates precisely within the second set of neighboring slots and fingers 37.

A most preferred shape and form of the interlock-able connection 35 between clips 10 is detailed in FIGS. 15 and 16, which shows that interlock-able connections of each clip 10 include a multiple of rounded fingers 41 inter-spaced with a multiple of rounded slots 44. Each rounded finger has a finger radius 42 that smoothly transitions back to the clip into a socket radius 43 that forms the next rounded slot, which in turn transitions back to the finger radius of the next rounded finger.

As discussed above, the first set of slots and fingers 32 at the first end edge 26 of each clip 10 are an inverted image of the second set of slots and fingers 33 at the second end edge 27 of each clip, in that each of the multiple of rounded fingers 41, as inter-spaced with the multiple of rounded slots 44, are configured so they could mate-ably interlock with the rounded fingers and rounded slots at the opposite edge of the clip. Preferred forms of the slots and fingers are shown in FIGS. 1 and 2. Specifically, FIG. 1, along with FIGS. 3 through 9 and 15 show sets of slots and fingers having a 'serpentine' form and FIG. 2, along with FIGS. 4, 10 through 14 and 16 showing sets of slots and fingers having a 'bulbed' form. Both are examples of the smoothly transitioning slot and finger elements of the interlock-able connection 35, as embodied by the present invention.

Also in the alternative, the first neighboring clip 10A or the second neighboring clip 10B can be without a aperture 21 and mouth 22, and the neighboring clip cam be utilized as a label or auxiliary tag. With this 'blank' neighbor, any indicia desired, could be place as a removable or attach-able and interlock-able label to the clip 10.

With these most preferred shapes of the interlock-able connection 35, the clip can be pulled along the length of the strip 12, or bent and handled without a premature separation or release of the interlock-able connections of each clip 10. The strip of clips for use in the present invention can be made up of any reasonably flat material 11 that is even minimally flexible, to provide for the neck 16 of the bag 15 to enter the mouth 22 of the clip, and held within the aperture 21. Most preferably, the flat material of the clip may be any resilient plastic material, such as polystyrene or polyethylene. Fibrous materials can also be used for the flat material, such as a wood or paper produce. Additionally, the clip material can be recycled or recyclable. Also alternatively, the flat material of the clip can be biodegradable, or water soluble, or include any other material known to a person skilled in the art of thin plastic article manufacture. Advantageously, the clip of the present invention can be formed of a softer or more flexible material as compared to clips that require a breaking or fracturing of material for separation. The present clip does not require the flat material to be brittle, and can instead form the unique and smoothly transitioning interlock-able connection 35, without the need for a brittle fracturing to separate neighboring clips or the leaving of a sharp or jagged residual edge on the clip.

Preferably, each clip 10 of the present invention is cut by a progressive punch and die and then re-mated and connected together in series to form the strip 12 of clips. This procedure is preferable in that it ensures the individual clips have no sharp edges and further allows the clip to be formed from a wide variety of materials, as discussed above. Additionally, the clips of the present invention is a great improvement and help in the mechanized and automated production environment, by virtue of allowing for the creation of an endless stream of clips to a conventional bagging machine line.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A plurality of clips of a flat material usable to close a neck of a bag, the plurality of clips comprising a clip adjoined to a first neighboring clip and to a second neighboring clip, each of the plurality of clips comprising:
   a planar clip surface surrounding an aperture having a singular mouth, a side edge of the clip consisting of the singular mouth located thereon, and the mouth for receiving the neck of the bag into the aperture;
   a first end edge, opposite from a second end edge, with the side edge of each clip located between the first end edge and the second end edge;
   the first edge end of the clip consisting of a first set of rounded slots and fingers, and the second end edge of the clip consisting of a second set of rounded slots and fingers;
   the first set of slots and fingers of the first neighboring clip interlock-ably re-mated into the first set of rounded slots and fingers after an initial disconnection from the first set of rounded slots and fingers when each clip is formed, the first set of slots and fingers of the first neighboring clip separated from the first set of rounded slots and fingers of the clip without fracture of the flat material, and re-mated to the first of rounded slots and fingers of the clip without fracture of the flat material;
   the first set of slots and fingers of each clip includes a first multiple of smoothly contoured rounded fingers and a first multiple of smoothly contoured rounded slots;
   the second set of rounded slots and fingers of the clip interlock-ably re-mated into the second set of slots and fingers of the second neighboring clip after an initial disconnection from the second set of rounded slots and fingers of the clip when each clip is formed, the second set of rounded slots and fingers of the clip separated from the second set of slots and fingers of the second neighboring clip without fracture of the flat material, and re-mated to the second set of rounded slots and fingers of the clip without fracture of the flat material;
   each of the first finger radius smoothly transitions into each of the first socket radius to form each of the first multiple of smoothly contoured rounded slots, and each of the first multiple of smoothly contoured rounded slots in turn transitions back to each first slot radius of each of the first set of rounded slots and fingers; and
   each of the second finger radius smoothly transitions into each of the second socket radius to form each of the second multiple of smoothly contoured rounded slots, and each of the second multiple of smoothly contoured rounded slots in turn transitions back to each second slot radius of each of the second set of rounded slots and fingers.

2. The clips of claim 1, wherein:
   the first set of slots and fingers of the first neighboring clip re-mates and connects precisely within the first set of slots and fingers of the clip without fracture of the flat material; and
   the second set of slots and fingers of the second neighboring clip re-mates and connects precisely within the second set of slots and fingers of the clip without fracture of the flat material.

3. The clips of claim 1, wherein the flat material is a resilient polystyrene.

4. The clips of claim 1, wherein the flat material is a resilient plastic.

5. The clips of claim 1, wherein the flat material is a biodegradable material.

6. The clips of claim 1, wherein the flat material is a fibrous material.

7. The clips of claim 1, wherein the flat material is a resilient biodegradable polyethylene.

8. A strip of closure clips including a multiple of adjoined clips, with each clip of the strip of closure clips to close a neck of a bag, the strip of closure clips comprising:
   a planar clip surface surrounding an aperture having a singular mouth, a side edge of each clip consisting of the singular mouth located thereon, and the mouth for receiving the neck of the bag into the aperture;
   each clip of the strip of closure clips including a first end edge, opposite from a second end edge, with the side edge of the clip located between the first end edge and the second end edge;
   the first edge end of each clip of the strip of closure clips consisting of a first set of rounded slots and fingers, and the second end edge of the clip consisting of a second set of rounded slots and fingers;
   a first set of neighboring slots and fingers interlock-ably re-mated into the first set of rounded slots and fingers after an initial disconnection from the first set of rounded slots and fingers when the clip is formed, the first set of neighboring slots and fingers separated from the first set of rounded slots and fingers without fracture of the flat material, and re-mated to the first set of rounded slots and fingers without fracture of the flat material;
   the second set of rounded slots and fingers interlock-ably re-mated into a second neighboring set of slots and fingers after an initial disconnection from the second set of rounded slots and fingers when the clip is formed, the second set of rounded slots and fingers separated from the second neighboring set of slots and fingers without fracture of the flat material, and re-mated to the second set of rounded slots and fingers without fracture of the flat material;
   each of the first set of rounded slots and fingers smoothly transitions into each of the first neighboring set of slots and fingers, and the first set of neighboring slots and fingers separated from the first set of rounded slots and fingers without leaving a jagged edge on the clip, when the clip is separated from the strip of closure clips; and
   each of the second set of rounded slots and fingers smoothly transitions into each of the second neighboring set of slots and fingers, and the second set of neighboring slots and fingers separated from the second set of rounded slots and fingers without leaving a jagged edge on the clip, when the clip is separated from the strip of closure clips.

9. The strip of closure clips of claim 8, wherein:
the first set of neighboring slots and fingers matches to and mates precisely within the first set of slots and fingers of each clip of the strip of closure clips; and
the second set of neighboring slots and fingers matches to and mates precisely within the second set of slots and fingers of each clip of the strip of closure clips.

10. The strip of closure clips of claim 8, wherein:
the first neighboring fingers re-mates and connects precisely within the slots without fracture of the flat material; and
the fingers re-mates and connects precisely within the second neighboring slots without fracture of the flat material.

11. The strip of closure clips of claim 8, wherein the flat material is a resilient polystyrene.

12. The strip of closure clips of claim 8, wherein the flat material is a resilient plastic.

13. The strip of closure clips of claim 8, wherein the flat material is a biodegradable material.

14. The strip of closure clips of claim 8, wherein the flat material is a fibrous material.

15. The strip of closure clips of claim 8, wherein the flat material is a resilient biodegradable polyethylene.

* * * * *